United States Patent [19]

Klein et al.

[11] Patent Number: 4,782,111
[45] Date of Patent: Nov. 1, 1988

[54] COLORANT FORMULATION

[75] Inventors: Peter Klein, Wiesbaden; Bernd Dewald, Idstein; Wolfgang Teige, Kelkheim, all of Fed. Rep. of Germany

[73] Assignee: Hoechst Aktiengesellschaft, Frankfurt am Main, Fed. Rep. of Germany

[21] Appl. No.: 939,261

[22] Filed: Dec. 5, 1986

Related U.S. Application Data

[63] Continuation of Ser. No. 759,074, Jul. 25, 1985, abandoned, which is a continuation of Ser. No. 565,829, Dec. 27, 1983, abandoned.

[30] Foreign Application Priority Data

Dec. 29, 1982 [DE] Fed. Rep. of Germany ....... 3248492

[51] Int. Cl.$^4$ ............................................. C08L 67/02
[52] U.S. Cl. ..................................... 524/539; 525/444
[58] Field of Search ......................... 525/444; 524/539

[56] References Cited

U.S. PATENT DOCUMENTS 4,022,748  5/1977  Schlichting .......................... 525/64

FOREIGN PATENT DOCUMENTS 53-71611  6/1978  Japan .

OTHER PUBLICATIONS

Ullmanns Encyklopaedie der technischen Chemie, 3rd Ed., vol. 11, Urban & Schwarzenberg, Munich, 1960, "Kunststoffe" (Plastics) p. 85.

Primary Examiner—Patricia Short

[57] ABSTRACT

A colorant formulation is described for mass-coloring high-melting polyesters. It comprises colorant and support for the colorant. The colorant formulation has a recrystallization exotherm of 8 to 55 joule/g between 210° C. and 150° C.

2 Claims, No Drawings

COLORANT FORMULATION

CROSS REFERENCE TO RELATED APPLICATIONS

This case is a continuation of application Ser. No. 759,074, filed July 25, 1985, now abandoned, which is a continuation of application Ser. No. 565,829, filed Dec. 27, 1983, now abandoned.

The invention relates to a colorant formulation of colorant and support for the colorant for mass-coloring high-melting polyesters of the basic unit

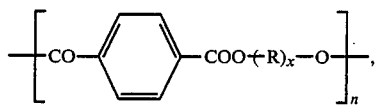

where R can be equal to $(CH_2)_x$ with $x=2-6$ or

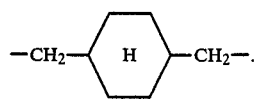

There is a whole series of processes for mass-coloring polyesters. Addition of the colorant at as early a stage as the polycondensation of the polyester requires highly heat-resistant colorants because of the high polycondensation temperatures. A further precondition for a mass-coloring process is large production batches, since the switch from one color to another is made expensive and time-consuming by the fact that the polycondensation unit has to be cleaned in between. If pigments are used they have to be dispersed in ethylene glycol.

It is also possible to inject the colorant or the colorant formulation as a melt into the melt flow of the polymer to be colored. That requires a technically relatively complicated setup.

It is simpler and more economical, especially if relatively small amounts are to be colored, to admix a colorant product in the form of granules to the chips of the polyester to be colored, for example in a tumble dryer or continuously as the polyester chips to be colored are fed into an extruder.

The currently existing colorant formulations frequently contain an insufficient colorant content and have the disadvantage that if they are in the form of a granulate or powder they tend to stick together on heating. If the support content in the colorant formulation is excessively high, the properties of the end products deteriorate: for example the textile processing properties of fibers and filaments can be impaired. Similarly, sprinkling the dyestuff in a tumble dryer onto polyester chips to be colored can easily lead to agglutination if the sticking tendency is too high.

The mass-coloring of polyesters with pigment formulations on the basis of copolyesters is known.

Thus, European Patent Application No. 8,373 A1 discloses that a pigment formulation for mass-coloring linear polyesters can be prepared by solvent-salt kneading 20 to 80 parts of pigment and 80 to 20 parts of a polyester which melts at between 60° and 160° C. into a preconcentrate which is melted together with a spinnable linear polyester and processed into a granulate. The granulate advantageously contains 3 to 30% by weight of pigment. The polyesters are those of aromatic and/or aliphatic dicarboxylic acids with aliphatic diols. Examples of dicarboxylic acids are terephthalic acid, isophthalic acid, azelaic acid, sebacic acid and adipic acid; possible glycols are ethylene glycol, 1,4-butanediol, 1,4-di(hydroxymethyl)-cyclohexane and neopentyl glycol. Polyesters particularly suitable for preparing the granulate are made from terephthalic and azelaic acids and butanediol and diethylene glycol. These copolyesters are kneaded in a complicated salt kneading process together with the desired pigment and with sodium chloride and diacetone alcohol, the kneaded mixture is then treated with water, ground, filtered, washed, dried and then mixed with polyethylene terephthalate, and this mixture is processed via several stages into a granulate. In all embodiments, polyethylene terephthalate is the predominant constituent of the granulate. It is true that in Examples 6 and 9 1,4-butanediol is also used, but only as a constituent of the preconcentrate and together with diethylene glycol as the second diol component; the butanediol-containing copolyesters of this prior art are amorphous. Moreover, the preconcentrate then always has added to it more polyethylene terephthalate than there is copolyester contained therein.

This known pigment formulation contains, as the examples show, only up to 30% by weight of colorant, is not sufficiently safe from agglutination, and can have an adverse effect on the lightfastness of the colored polyester.

It is the object of the invention to eliminate said disadvantages and to provide a colorant formulation which permits lightfast mass-coloration of polyester, which is simple to prepare, which contains high levels of colorant, and the granulate of which is not prone to the troublesome agglutination in the course of drying and processing.

This object is achieved when a colorant formulation of the type described in the introduction has a recrystallization exotherm of 8–55, preferably 15–40, joule/g between 210 and 150, preferably between 200 and 160, °C.

The support for the colorant advantageously comprises a linear polyester having a softening point of above 60° C. and a high molecular weight butylene terephthalate; the linear polyester is in particular a copolyester of terephthalic/isophthalic acid and ethylene glycol.

High-melting polyesters are those with a melting point above 200° C., for example those of terephthalic acid with diols of the formula $HO(CH_2)_x$—OH or

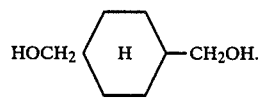

For the purposes of the present invention, "linear polyesters having a softening point of above 60° C." are those polyesters and copolyesters which up to now have already been used in supports for colorants and incolorant formulations. Polyesters which are suitable according to the invention are named, for example, in German Offenlegungsschrift No. 1,965,379, and copolyesters which are suitable according to the invention are named in German Auslegeschrift No. 1,183,195. A copolyester of terephthalic and isophthalic acids with ethylene glycol where the acid component preferably contains 20–35 mole % of isophthalic acid is very particularly highly suitable.

These polyesters or copolyesters which contain the colorant now have added to them sufficient polybutylene terephthalate for the overall colorant formulation to have a recrystallization exotherm of 8 to 55 joule/g, preferably 15 to 40 joule/g, of colorant formulation between 210° C. and 150° C., preferably between 200° and 160° C.

The melt sample to be investigated is cooled down at a rate of 20° C./min; the measurement is performed in a Perkin Elmer DSC 2-C differential scanning calorimeter.

Suitable polybutylene terephthalate has a specific viscosity of 0.5 to 1.5, and a suitable copolyester has a specific viscosity of about 0.4–1.0. The specific viscosity ($\eta_{spec.}$) is determined at 25° C. in dichloroacetic acid. The polymer concentration for the measurement is 1 g/100 ml of liquid.

The softening temperature is determined following DIN 53,460; the temperature is raised as in method A but at 5° C. per minute. The test specimen used was extruded granulate with an elliptical cross-section (long axis 3 mm, short axis 2 mm, cut length 6 mm). The measurements were carried out in air.

The colorant formulation can be prepared in a known manner, for example by mixing the cold constituents, namely polybutylene terephthalate, linear polyester, and colorant, and melting, homogenizing, cooling and granulating the mixture.

The preparation of the formulation is therefore very simple and, what is more, offers the ecological and economic advantage that there is no need for an expensive and environmentally harmful salt-kneading of the dyestuff formulation, as is still necessary in the preparation of some products.

The polymer mixture used as the support for the colorant ensures rapid adsorption and homogeneous distribution of the colorant. The melting of softening point of the support for the colorant is equal to or lower than the melting point or softening point of the colorant, so that this factor likewise permits easy and satisfactory homogenization of the mixture. If desired the cooling can be controlled in such a way as to ensure best possible recrystallization.

The colorants used for preparing the colorant formulation according to the invention are preferably dyestuffs which are soluble in polyethylene terephthalate. However, it is also possible to use pigments which are insoluble in polyester, as well as mixtures of various dyestuffs, and mixtures of dyestuffs and pigments.

The advantages of the colorant formulation according to the invention are particularly marked when soluble colorants are used. If polyester-insoluble pigments are used the colorant formulation according to the invention is likewise very useful, but frequently the agglutination on drying or on introducing the colorant formulation into the extruder does take place, though to a lesser extent.

The granulate of the colorant formulation according to the invention is particularly highly suitable for mixing with the granulate to be colored, for example in a dryer or in the course of feeding into the extruder at high temperatures of up to about 200° C.

The colorant formulation thus offers economic advantages not only as regards its preparation but also by virtue of the fact that it can be advantageously used in conventional mass-coloring processes for polyesters without additional, auxiliary equipment, such as for example an injector, being necessary. The fact that it is possible to admix the colorant formulation in the extruder enables even small production batches to be colored economically.

The support for the colorant is readily soluble in polyethylene terephthalate and polybutylene terephthalate, and the formulation melt very rapidly becomes distributed homogeneously in the polyester melt to be colored. Polyester fibers and filaments, for example, are therefore colored very level.

As a consequence of the high colorant concentration in the colorant formulation, or the low level of support for the colorant to be introduced into the polyester to be colored, and as a consequence of the fact that the support is very readily soluble in the substrate to be colored, it impairs the fiber properties very little, if at all, and ensures excellent processability of the fibers prepared from the substrate not only in spinning but also in weaving.

The fibers can be processed into high quality products having good fastness properties and end-use properties.

Similar, very uniformly colored plastics articles can be produced.

The invention will now be explained in more detail by reference to examples.

EXAMPLE 1

300 g of dry ground polyethylene terephthalate coisophthalate ($\eta_{spec.}=0.7$) which contained terephthalic acid and isophthalic acid in a weight ratio of 75:25 were mixed with 300 g of dry ground polybutylene terephthalate ($\eta_{spec.}=1.3$) and 400 g of a blue anthraquinone dyestuff (C.I. Solvent Blue 122) with a melting point of 230° C. This mixture was melted, at 230°–240° C., and homogenized in a twin-screw extruder or extrusion kneader. The homogenized melt was extruded in the form of a strand which was cooled and granulated.

The resulting granulate had a crystallization temperature of $T_K=117°$ C. and a recrystallization temperature of $T_{RK}=177°$ C. The recrystallizaion enthalpy was 23 J/g.

The chips prepared have no agglutination tendency up to 200° C. dry temperature.

The granulate was used for coloring the production of polyethylene terephthalic fibers. There was no agglutination as the granulate was admixed into the hot extruder intake zone at 200° C. The fibers produced were colored perfectly level and had a satisfactory lightfastness. The mechanical properties of the fibers were not adversely affected: the fibers gave problemfree processing in spinning and dyeing.

In Examples 2–8 and Comparative Examples 1 and 2 the properties of various colorant formulations were investigated as a function of the composition and of the respective crystallization enthalpy. IT copolyester in the examples is to be understood as meaning a copolyester of ethylene glycol and isophthalic acid and terephthalic acid in a weight ratio of 1:3, which has a specific viscosity $\eta_{spec.}=0.7$. Blue denotes that the copolyester and 40 parts of Solvent Blue 122.

PBT denotes polybutylene terephthalate having a specific viscosity of $\eta_{spec.}=1.2$.

IT copolyester black denotes the same copolymer of isopthalic acid, terephthalic acid and ethylene glycol as in Examples 2–4 and 8, but with 30% by weight of Pigment Black 7, based on the mixture of copolymer/dyestuff.

The table summarizing Examples 2 to 8 shows that the tackiness increases with decreasing recrystallization enthalpy of the colorant formulation; this phenomenon, less pronounced but still clearly present, also occurs if a pigment (carbon black) (as in Examples 5, 6 and 7) is present instead of the soluble dyestuff (Examples 1-4 and 8).

Comparative Examples 1 and 2 show that results are unsatisfactory in respect of agglutination when the recrystallization enthalpy is too low at 5.4 and 5.8 joule/g respectively. Agglutination occurred at temperatures as low as 90° C. and 160° C. respectively. Flowability and meterability of the granulate were severely impaired. It was no longer possible to meter the colorant formulations accurately.

By contrast, the colorant formulations of Examples 1–8 did not give rise to significant agglutination in the course of drying or on introduction into the extruder.

To test the tackiness, 100 g of chips or granulate were raised to the test temperature in a drying cabinet in the course of 1 hour and were stirred at this temperature by means of a metal stirrer. Chips labeled "slightly tacky" in the table are difficult or even impossible to mix with the stirrer.

TABLE

| Example No. | Polymer Parts by weight | Recrystallization temperature °C. | Recrystallization enthalpy joule/g | Slightly tacky °C. | Has melted |
|---|---|---|---|---|---|
| 2 | 100 of IT copolyester blue 90 of PBT | 177 | 26.0 | 210 | 230 |
| 3 | 100 of IT copolyester blue 60 of PBT | 175 | 22.7 | 200 | 210 |
| 4 | 100 of IT copolyester blue 30 PBT | 169 | 15.5 | 180 | 210 |
| 5 | 100 of IT copolyester black 105 of PBT | 190 | 28.1 | 210 | 230 |
| 6 | 100 of IT copolyester black 70 of PBT | 188 | 20.5 | 210 | 230 |
| 7 | 100 of IT copolyester black 35 of PBT | 183 | 15.2 | 200 | 230 |
| 8 | 100 of IT copolyester blue 200 of PBT | 178 | 46.0 | >210 | 230 |
| Comparative Example 1 | 100 of IT copolyester blue 10 of PBT | 155 | 5.4 | 90 | 210 |
| Comparative Example 2 | 100 of IT copolyester black 10 of PBT | 164 | 5.8 | 160 | 200 |

EXAMPLE 9

On the model of Example 1 a dyestuff combination of
304 g of Solvent Blue 122,
20 g of Solvent Green 28 and
56.4 g of Pigment Black 7 was used together with
131.6 g of copolyester and
488 g of polybutylene terephthalate.
The constituents were thoroughly mixed, and the mixture was processed into a granulate as in Example 1. The recrystallization enthalpy was 28.9 joule/g. The chips produced had no agglutination tendency up to 210° C. 4 parts of this colorant formulation were incorporated into 96 parts of polyethylene terephthalate which was melt-spun without problems into filaments colored a deep navy and having excellent color levelness and outstanding fastness properties.

We claim:
1. A colorant formulation for mass-coloring high-melting polyesters of the basic unit

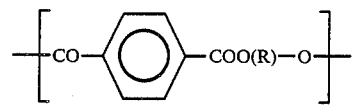

where $R = +CH_2+_x$ with $x = 2-6$ or

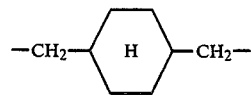

said colorant formulation comprising:
more than 3% by weight of a colorant consisting essentially of a dyestuff which is soluble in polyester or a pigment which is insoluble in polyester or a mixture thereof, essentially the balance of said colorant formulation consisting essentially of a support for the colorant comprising a mixture of a linear polyester having a softening point above 60° C. and a specific viscosity of from 0.4 to 1.0 gl/g and of high molecular weight polybutylene terephthalate having a specific viscosity of from 0.5 to 1.5 dl/g and where the amount of polybutylene terephthalate in the mixture is adjusted so that the colorant formulation has a recrystallization exotherm of 8 to 55 joule/b between 210° C. and 150° C.

2. A colorant formulation as claimed in claim 1, wherein:
this linear polyester having a softening point above 60° C. is a copolyester of terephthalic acid/isophthalic acid and ethylene glycol,
the colorant consists essentially of a said dyestuff, and
the colorant formulation is in the form of a granuate, the granules of which are essentially non-agglutinating in a hot zone which is at a temperature of at least 180° C.

* * * * *